US009564831B2

(12) United States Patent
Damson et al.

(10) Patent No.: US 9,564,831 B2
(45) Date of Patent: Feb. 7, 2017

(54) METHOD AND CONTROL UNIT FOR THE PULSE-WIDTH-MODULATED CONTROL OF SWITCHING ELEMENTS OF A PULSE-CONTROLLED INVERTER

(75) Inventors: Mark Damson, Stuttgart (DE); Daniel Raichle, Vaihingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 41 days.

(21) Appl. No.: 13/882,112

(22) PCT Filed: Aug. 24, 2011

(86) PCT No.: PCT/EP2011/064566
§ 371 (c)(1),
(2), (4) Date: May 31, 2013

(87) PCT Pub. No.: WO2012/055602
PCT Pub. Date: May 3, 2012

(65) Prior Publication Data
US 2013/0258735 A1    Oct. 3, 2013

(30) Foreign Application Priority Data

Oct. 26, 2010 (DE) .................. 10 2010 042 908

(51) Int. Cl.
*H02M 7/537* (2006.01)
*H02M 7/529* (2006.01)
*H02M 7/5387* (2007.01)

(52) U.S. Cl.
CPC ............. *H02M 7/537* (2013.01); *H02M 7/529* (2013.01); *H02M 7/53873* (2013.01)

(58) Field of Classification Search
CPC .. H02M 7/537; H02M 7/529; H02M 7/53873;
H02M 7/515; H02M 7/53; H02M 7/538466; H02M 7/53862; H02M 7/521; H02M 7/5387; H02M 7/53871
(Continued)

(56) References Cited

U.S. PATENT DOCUMENTS

| 7,102,327 B2 * | 9/2006 | Ho ........................... H02P 8/12 |
| | | 318/599 |
| 2011/0128763 A1 * | 6/2011 | Iwata ........................ H02J 7/35 |
| | | 363/98 |
| 2011/0133678 A1 * | 6/2011 | Tomigashi .............. H02P 21/22 |
| | | 318/400.04 |

FOREIGN PATENT DOCUMENTS

| CN | 102097999 A | 6/2011 |
| DE | 10 2005 011503 | 5/2006 |

(Continued)

OTHER PUBLICATIONS

International Search Report, dated Dec. 27, 2011, issued in corresponding PCT Application No. PCT/EP2011/064566.

*Primary Examiner* — Jue Zhang
*Assistant Examiner* — Lakaisha Jackson
(74) *Attorney, Agent, or Firm* — Norton Rose Fulbright US LLP; Gerard Messina

(57) ABSTRACT

A method is described for the pulse-width-modulated control of switching elements of a pulse-controlled inverter, the impulses of successive signal periods of the control signal, in a first control mode, respectively having a uniform start or end time within the signal period, or being situated uniformly centered in the middle of the signal period, and the impulses of successive signal periods of the control signal, in a second control mode, being situated alternately at the beginning of the signal period and at the end of the signal period.

4 Claims, 3 Drawing Sheets

(58) Field of Classification Search
USPC .................................... 363/97, 98, 131, 132
See application file for complete search history.

(56) References Cited

FOREIGN PATENT DOCUMENTS

DE      102005011503 B3 * 5/2006
DE     10 2009 008 58     8/2010

\* cited by examiner

METHOD AND CONTROL UNIT FOR THE PULSE-WIDTH-MODULATED CONTROL OF SWITCHING ELEMENTS OF A PULSE-CONTROLLED INVERTER

FIELD OF THE INVENTION

The present invention relates to a method and a control unit for the pulse-width-modulated control of switching elements of a pulse-controlled inverter.

BACKGROUND INFORMATION

To drive hybrid or electric vehicles, electric machines are normally used in the form of polyphase machines, which are operated in combination with pulse-controlled inverters, which are often also simply called inverters. The electric machines in this context are operated selectively in a motor operating mode or a generator operating mode. In motor operation, the electric machine generates a driving torque, which, when used in a hybrid vehicle, supports an internal combustion engine in an acceleration phase, for example. In generator operation, the electric machine generates electrical energy, which is stored in an energy store such as a traction battery, for example. An intermediate circuit capacitor is provided for stabilizing the battery voltage. The operating mode and the output of the electric machine are set using the pulse-controlled inverter. The pulse-controlled inverter includes power semiconductor switches—called simply power switches in the following—such as MOSFETs (metal oxide semiconductor field-effect transistors), IGBTs (insulated gate bipolar transistors) or MCTs (MOS controlled thyristor), which are controlled via a control unit.

It is fundamentally known to control the switching elements of a pulse-controlled inverter in a pulse-width modulated manner. For this purpose, a constant period duration or constant modulation frequency is normally used for the pulse width modulation (PWM). Frequently, a symmetrical pulse width modulation is used, in which an impulse is centered within a signal period such that the duration of the pause is distributed equally to the beginning and the end of the signal period.

For specific operating points of an electric machine controlled by a pulse-controlled inverter, it may be practical, e.g. for reasons of minimizing losses and/or minimizing EMC radiation (EMC=electromagnetic compatibility), to control the switching elements of the pulse-controlled inverter at a lower switching frequency, to which the system is able to switch over while the electric machine and thus the pulse-controlled inverter are in operation. A switchover to half the switching frequency has proved to be particularly advantageous.

In the simplest case, such halving of the switching frequency may be achieved by halving the modulation frequency.

SUMMARY

The present invention provides a method for the pulse-width modulated control of switching elements of a pulse-controlled inverter, the impulses of successive signal periods of the control signal, in a first control mode, respectively having a uniform start or end time within the signal period, or being uniformly centered in the middle of the signal period, and the impulses of successive signal periods of the control signal, in a second control mode, being situated alternately at the beginning of the signal period and at the end of the signal period.

The present invention also provides a control unit for the pulse-width modulated control of switching elements of a pulse-controlled inverter, a first control mode being provided, in which the impulses of successive signal periods of the control signal respectively have a uniform start or end time within the signal period, or are uniformly centered in the middle of the signal period, and a second control mode being provided, in which the impulses of successive signal periods of the control signal are situated alternately at the beginning of the signal period and at the end of the signal period.

The present invention is based on the fundamental idea of halving the switching frequency and thus the switching rate of the switching elements of a pulse-controlled inverter, not by halving the modulation frequency or doubling the period duration of the pulse-width modulated control signal, but rather by an alternately left-aligned and right-aligned pulse-width modulation, that is to say, an alternating arrangement of the impulses of successive signal periods of the control signal alternately at the beginning of the signal period and at the end of the signal period.

For controlling the switching elements of the pulse-controlled inverter, the associated control unit usually has one or multiple software tasks synchronous to the pulse width modulation, which are started e.g. via an interrupt synchronously to a signal period raster of the pulse width modulation. In this context, the control unit determines, among other things, also the duty factors and/or the switching times of the control signals for the respectively next signal period.

The method of the present invention and the control unit of the present invention are used to halve the switching frequency of the switching elements of the pulse-controlled inverter in the second control mode while maintaining the period duration or modulation frequency of the control signal. The controlled variable is thus also adapted at a uniform frequency such that the dynamics of the current control remain unchanged and thus secure operation is ensured in particular even at high rotational speeds of the electric machine. A call frequency of the PWM-synchronous software tasks thus also remains unaffected by the halving of the switching frequency such that no additional adaptations, e.g. with respect to signal filtering or of the control algorithm, are required in the software of the control unit. The computation of the duty factors by the control unit may also be maintained unchanged. Only the determination of the switching times is adapted in the second control mode to the changed modulation method, which may be implemented, however, at an extremely low programming expenditure.

In order to achieve a highly dynamic current control, the duty factor of the impulses of successive signal periods of the control signal is variable according to one specific embodiment of the present invention.

Advantageously, it is possible to switch between the first and the second control mode while the pulse-controlled inverter or the electric machine controlled by it are in operation.

DETAILED DESCRIPTION

Figure 1:
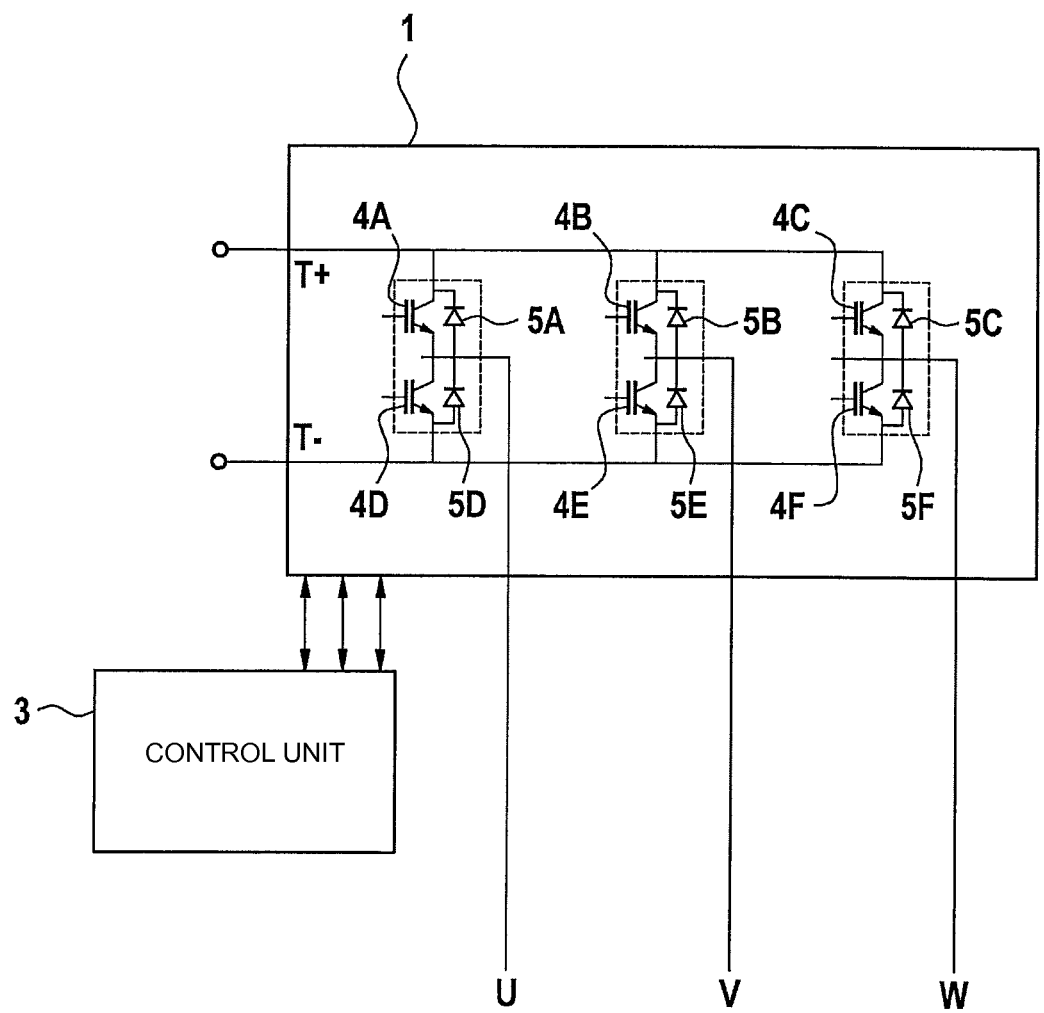
FIG. 1 shows a schematic representation of a pulse-controlled inverter.

FIG. 1 shows a schematic representation of a pulse-controlled inverter 1 with an associated control unit 3. Pulse-controlled inverter 2 has multiple switching elements in the form of power switches 4A-4F, which are connected to individual phases U, V, W of an electric machine (not shown) and which switch the phases U, V, W either towards a high reference potential T+ or towards a low reference potential T−. The power switches 4A-4C connected to the high reference potential 4A-4C are also called high-side switches and the power switches 4D-4F connected to the low reference potential T− are also called low-side switches. Pulse-controlled inverter 2 includes additional power components in the form of free-wheeling diodes 5A-5F, which in the exemplary embodiment shown are arranged in the form of a six-pulse rectifier bridge circuit. For this purpose, respectively one diode 5A-5F is arranged in parallel to one of the power switches 4A-4F. Power switches 4A-4F may be developed for example as IGBTs or as MOSFETs. For this purpose, diodes 5A-5F do not have to implemented as separate components, but may also be integrated into the respective power switches 4A-4F, as is already the case in MOSFETS for example for technological reasons. Pulse-controlled inverter 2 determines the output and the operating mode of the electrical machine and is controlled by control unit 3.

Power switches 4A-4F of pulse-controlled inverter 1 are controlled by control unit 3 using a pulse-width-modulated control signal. In a first control mode, the impulses of successive signal periods of the control signal respectively have a uniform start or end time within the signal period or the impulses are uniformly centered in the middle of the signal period.

Figure 2:
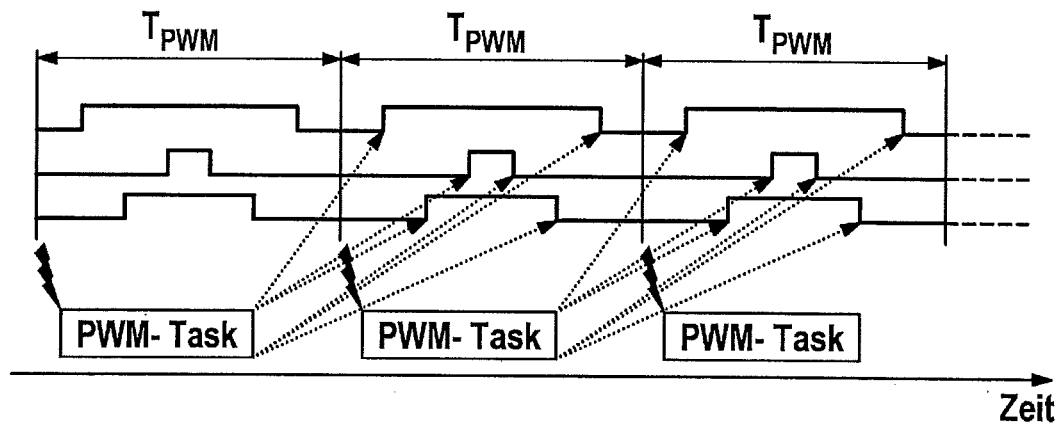
FIG. 2 shows a time characteristic of a pulse-width modulated control signal in a first control mode without adaptation of the duty factor.
Figure 3:
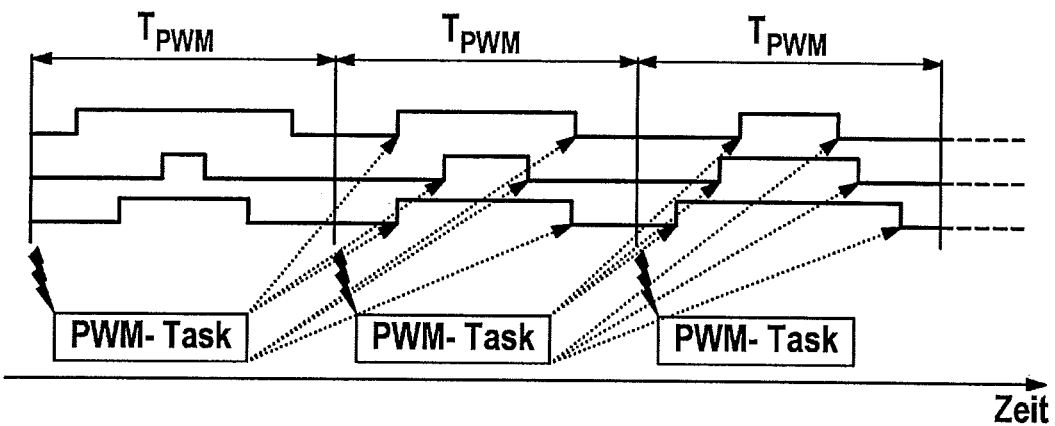
FIG. 3 shows a time characteristic of a pulse-width modulated control signal in the first control mode with adaptation of the duty factor.

FIGS. 2 and 3 show the time characteristic of three successive signal periods in the first control mode at a uniform period duration $T_{PWM}$. The impulses, that is to say, a turn-on time $T_E$ are respectively centered in the middle of the signal period, for example, such that a pause time $T_P$ is distributed evenly to a first time span at the beginning of the signal period and to a second time span at the end of the signal period. The specific embodiments according to FIGS. 2 and 3 differ in that in the specific embodiment shown in FIG. 2 there is no adaptation of the duty factor, whereas the duty factor in the specific embodiment of FIG. 3 is adapted from one signal period to the next.

In the second control mode, the impulses of successive signal periods of the control signal are situated alternately at the beginning of the signal period (left-aligned) and at the end of the signal period (right-aligned).

Figure 4:
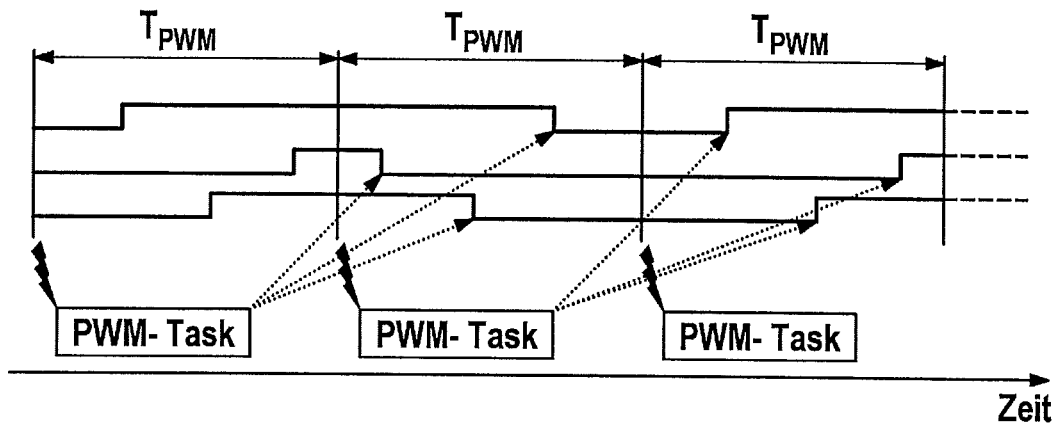
FIG. 4 shows a time characteristic of a pulse-width modulated control signal in a second control mode without adaptation of the duty factor.
Figure 5:
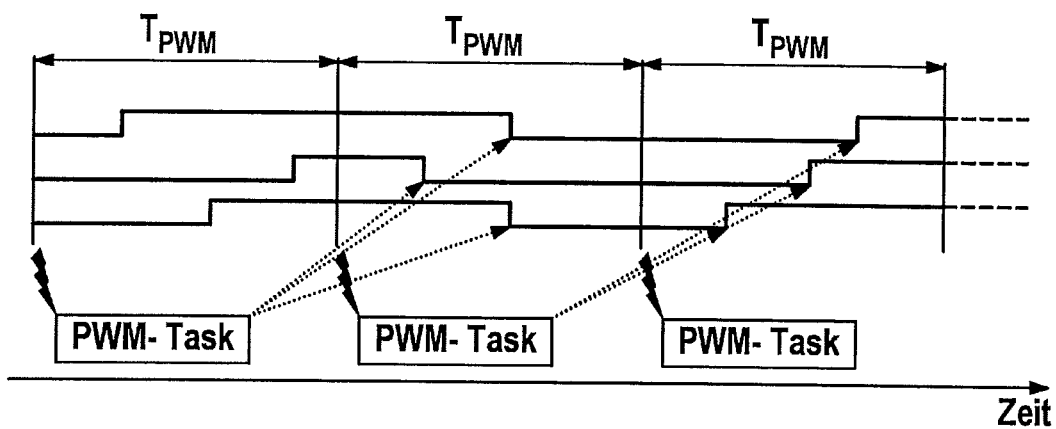
FIG. 5 shows a time characteristic of a pulse-width modulated control signal in the second control mode with adaptation of the duty factor.

FIGS. 4 and 5 show the time characteristic of three successive signal periods in the second control mode, likewise at a uniform period duration $T_{PWM}$. The impulses, that is to say, the turn-on times $T_E$, are situated alternately left-aligned and right-aligned. This effectively results in halving the switching frequency, that is to say, the switching rate of power switches 4A-4F, without affecting the period duration $T_{PWM}$ and thus the modulation frequency $f_{PWM}=1/T_{PWM}$. The specific embodiments according to FIGS. 4 and 5 differ again in that in the specific embodiment shown in FIG. 4 there is no adaptation of the duty factor, whereas the duty factor in the specific embodiment of FIG. 5 is adapted from one signal period to the next.

It is possible to switch between the two control modes while the electric machine and thus pulse-controlled inverter 1 are in operation.

For controlling switching elements 4A-4F of pulse-controlled inverter 1, the associated control unit 3 has software tasks (PWM tasks) synchronous to the pulse-width modulation, which are started e.g. via an interrupt synchronously to a signal period raster of the pulse width modulation. These remain largely unaffected by a switch of the control mode. Only the calculation of the switching times of the control signal is adapted to the respective control mode.

What is claimed is:

1. A method for a pulse-width-modulated control of switching elements of a pulse-controlled inverter, comprising:
in a first control mode, providing respective pulses for successive signal periods of a control signal, wherein each of the pulses at least one of:
has a uniform start time and a uniform end time within the respective signal period, and
is centered within the respective signal period; and
in a second control mode, providing a pulse which one of:
(a) has a start time at a beginning of a first of the successive signal periods and an end time at an end of a second of the successive signal periods, and
(b) has a start time at an end of the first of the successive signal periods and an end time at a beginning of the second of the successive signal periods;
wherein, during the second control mode, each of the first and second successive signal periods has either the start time of the pulse or the end time of the pulse.

2. The method as recited in claim 1, wherein a duty factor of the impulses of the successive signal periods of the control signal is variable.

3. The method as recited in claim 1, further comprising:
switching between the first control mode and the second control mode while the pulse-controlled inverter is in operation.

4. A control unit for a pulse-width-modulated control of switching elements of a pulse-controlled inverter, comprising:
an arrangement for, in a first control mode, providing respective pulses for successive signal periods of a control signal, wherein each of the pulses at least one of:
has a uniform start time and a uniform end time within the respective signal period, and
is centered within the respective signal period; and
an arrangement for, in a second control mode, providing a pulse which one of:
(a) has a start time at a beginning of a first of the successive signal periods and an end time at an end of a second of the successive signal periods, and
(b) has a start time at an end of the first of the successive signal periods and an end time at a beginning of the second of the successive signal periods;

wherein, during the second control mode, each of the first and second successive signal periods has either the start time of the pulse or the end time of the pulse.

\* \* \* \* \*